US012810397B2

(12) United States Patent
Park et al.

(10) Patent No.: US 12,810,397 B2
(45) Date of Patent: Nov. 24, 2026

(54) SYSTEM-ON-CHIP, ELECTRONIC DEVICE, AND OPERATING METHOD OF PROCESSOR FOR REDUCING IMAGE NOISE BASED ON IMAGE PYRAMID

(71) Applicant: Samsung Electronics Co., Ltd., Suwon-si (KR)

(72) Inventors: Jinwoo Park, Suwon-si (KR); Dusic Yoo, Suwon-si (KR); Seungwon Choi, Suwon-si (KR); Jongseong Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 65 days.

(21) Appl. No.: 18/965,042

(22) Filed: Dec. 2, 2024

(65) Prior Publication Data

US 2025/0342572 A1 Nov. 6, 2025

(30) Foreign Application Priority Data

May 3, 2024 (KR) ........................ 10-2024-0059413

(51) Int. Cl.
*G06T 5/70* (2024.01)
*G06T 3/40* (2024.01)
(Continued)

(52) U.S. Cl.
CPC .................. *G06T 5/70* (2024.01); *G06T 3/40* (2013.01); *G06T 5/50* (2013.01); *G06T 7/13* (2017.01);
(Continued)

(58) Field of Classification Search
None
See application file for complete search history.

(56) References Cited

U.S. PATENT DOCUMENTS 7,257,271 B2 8/2007 Adams, Jr. et al.
7,856,150 B2 * 12/2010 Li ............................. G06T 5/10 358/463
(Continued)

FOREIGN PATENT DOCUMENTS

WO WO-2026040150 A1 * 2/2026 ............... G06T 7/90
WO WO-2026040151 A1 * 2/2026 ............... G06T 7/90

OTHER PUBLICATIONS

Xue et al. "MPE-DETR: A multiscale pyramid enhancement network for object detection in low-light images", Image and Vision Computing 150 (2024) 105202 (Year: 2024).*
(Continued)

*Primary Examiner* — Randolph I Chu
(74) *Attorney, Agent, or Firm* — Fish & Richardson P.C.

(57) ABSTRACT

A system-on-chip, an electronic device, and an operating method of a processor for reducing noise in an image based on an image pyramid are provided. The system-on-chip includes a pyramid generation module outputting a Gaussian image of a highest layer and a Laplacian pyramid, based on an input image, a denoising process module denoising the Gaussian image of the highest layer and outputting a denoised image of the highest layer, and a pyramid reconstruction module receiving the Laplacian pyramid and the denoised image of the highest layer, generating a denoised image and edge grade information for each layer based on a Laplacian image of each layer, a denoised image of an upper layer that is higher than each layer, and edge grade information of the upper layer, and outputting an output image.

20 Claims, 13 Drawing Sheets

(51) Int. Cl.
*G06T 5/50* (2006.01)
*G06T 7/13* (2017.01)

(52) U.S. Cl.
CPC ............... *G06T 2207/20016* (2013.01); *G06T 2207/20192* (2013.01); *G06T 2207/20212* (2013.01)

(56) References Cited

U.S. PATENT DOCUMENTS

| | | | | |
|---|---|---|---|---|
| 8,411,938 | B2 * | 4/2013 | Zhang | G06T 3/4061 382/302 |
| 11,151,702 | B1 | 10/2021 | Tico et al. | |
| 11,475,569 | B2 * | 10/2022 | Xu | A61B 6/06 |
| 11,625,817 | B2 | 4/2023 | Tuna et al. | |
| 11,657,608 | B1 | 5/2023 | Zankl | |
| 2010/0142790 | A1 | 6/2010 | Chang | |
| 2023/0133074 | A1 | 5/2023 | Soons et al. | |

OTHER PUBLICATIONS

Paris et al. "Local Laplacian Filters: Edge-aware Image Processing with a Laplacian Pyramid", ACM Transactions on Graphics (Proceedings of SIGGRAPH 2011) (Year: 2011).*
WO-2026040150-A1 translation (Year: 2026).*
WO-2026040151-A1 translation (Year: 2026).*

* cited by examiner

SYSTEM-ON-CHIP, ELECTRONIC DEVICE, AND OPERATING METHOD OF PROCESSOR FOR REDUCING IMAGE NOISE BASED ON IMAGE PYRAMID

CROSS-REFERENCE TO RELATED APPLICATION

This application is based on and claims priority under 35 U.S.C. § 119 to Korean Patent Application No. 10-2024-0059413, filed on May 3, 2024, in the Korean Intellectual Property Office, the disclosure of which is incorporated by reference herein in its entirety.

BACKGROUND

The inventive concepts relate to image processing, and more particularly, to system-on-chips, electronic devices, and operating methods of processors for reducing noise in an image based on an image pyramid.

With the rapid development of electronic devices, various electronic devices capable of exchanging information or data are being used. Recently, mobile devices, such as smartphones, are equipped with a camera module and may photograph an object through the camera module and display the image of the object to a user on a display.

Because users are recently demanding high-pixel sensors having a reduced size, noise occurs due to various factors, and accordingly, technology for removing noise from images is desired. In particular, in a low-light environment in which the amount of light is insufficient, severe noise may occur, making it hard to distinguish pixel signals or edge information from noise. In this case, to obtain an image having quality satisfactory to a user, processing of low-frequency noise is necessary. A large filter is required to process low-frequency noise in a spatial domain, but it is occasionally difficult to use a large filter because of various factors such as hardware limitations.

SUMMARY

The inventive concepts provide system-on-chips, electronic devices, and operating methods of processors for accurately identifying an edge in a noisy image, especially captured in a low-light environment, removing noise from the image, and reducing image noise based on an image pyramid to provide clear image quality.

According to some aspects of the inventive concepts, there is provided a system-on-chip including a pyramid generation module configured to receive an input image, generate an image pyramid based on the input image, and output a Gaussian image of a highest layer and a Laplacian pyramid, the image pyramid including the Laplacian pyramid and a Gaussian pyramid, a denoising process module configured to receive the Gaussian image of the highest layer, perform a denoising operation on the Gaussian image of the highest layer, and output a denoised image of the highest layer, the denoised image of the highest layer indicating a Gaussian image obtained by removing noise from the Gaussian image of the highest layer, and a pyramid reconstruction module configured to receive the Laplacian pyramid and the denoised image of the highest layer, generate a denoised image and edge grade information for each layer based on a Laplacian image of each layer, a denoised image of an upper layer that is one level higher than each layer, and edge grade information of the upper layer, and output an output image based on a Laplacian image of a lowest layer, a denoised image of a first layer, and edge grade information of the first layer, the edge grade information of the upper layer including gain values corresponding to an edge of the Laplacian image of the upper layer, and the first layer being one level higher than the lowest layer.

According to some aspects of the inventive concepts, there is provided an electronic device including an image sensor configured to convert an optical signal of an object into an electrical signal and output an input image corresponding to the electrical signal and an image signal processor configured to receive the input image, perform an image processing operation on the input image, and output an output image. The image signal processor includes a pyramid generation module configured to generate an image pyramid based on the input image and output a Gaussian image of a highest layer and a Laplacian pyramid, the image pyramid including the Laplacian pyramid and a Gaussian pyramid, a denoising process module configured to receive the Gaussian image of the highest layer, perform a denoising operation on the Gaussian image of the highest layer, and output a denoised image of the highest layer, the denoised image of the highest layer indicating a Gaussian image obtained by removing noise from the Gaussian image of the highest layer, and a pyramid reconstruction module configured to receive the Laplacian pyramid and the denoised image of the highest layer, generate a denoised image and edge grade information for each layer based on a Laplacian image of each layer, a denoised image of an upper layer that is one level higher than each layer, and edge grade information of the upper layer, and output an output image based on a Laplacian image of a lowest layer, a denoised image of a first layer, and edge grade information of the first layer, the edge grade information of the upper layer including gain values corresponding to an edge of the Laplacian image of the upper layer, and the first layer being one level higher than the lowest layer.

According to some aspects of the inventive concepts, there is provided an operating method of a processor. The operating method includes an image receiving operation including receiving an input image, a pyramid decomposition operation including generating an image pyramid and a highest Gaussian image of a highest layer, based on the input image, a denoising operation including generating a highest denoised image by removing noise from the highest Gaussian image, the highest denoised image indicating a Gaussian image resulting from removing noise from the highest Gaussian image, a pyramid reconstruction operation including generating a denoised image and edge grade information for each of layers sequentially from the highest layer to a first layer, based on a Laplacian image of each layer in a Laplacian pyramid of the image pyramid, a denoised image of an upper layer that is one level higher than each layer, and edge grade information of the upper layer, the edge grade information of the upper layer including gain values corresponding to an edge of an Laplacian image of the upper layer, and an image output operation including outputting an output image, based on a Laplacian image of a lowest layer that is lower than the first layer, a first denoised image of the first layer, and first edge grade information.

BRIEF DESCRIPTION OF THE DRAWINGS

Embodiments will be more clearly understood from the following detailed description taken in conjunction with the accompanying drawings in which.

DETAILED DESCRIPTION

Hereinafter, some example embodiments are described with reference to the accompanying drawings.

Figure 1:
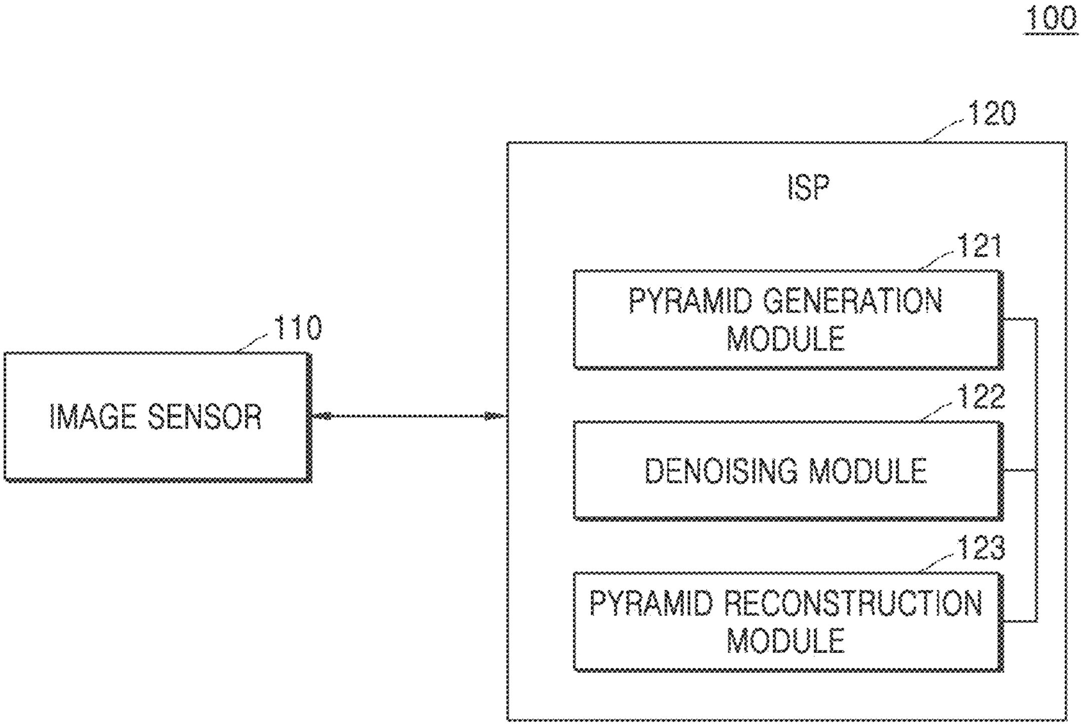
FIG. 1 is a block diagram of an electronic device according to some example embodiments.

FIG. 1 is a block diagram of an electronic device 100 according to some example embodiments.

Referring to FIG. 1, the electronic device 100 may include a mobile device such as a smartphone or a tablet personal computer (PC), a wearable device such as a smart watch, smart glasses, or smart clothing, a portable device such as a camera module or a digital camera, or an electronic device included in a vehicle. However, embodiments are not limited to those described above.

In some example embodiments, the electronic device 100 may include an image sensor 110 and an image signal processor (ISP) 120.

The image sensor 110 may convert an optical signal of an object into an electrical signal. The image sensor 110 may output an input image corresponding to the electrical signal. For example, the image sensor 110 may convert an optical signal of an object, which is input through an optical lens, into an electrical signal and generate and output an image (e.g., an input image) based on the electrical signal. In some example embodiments, the image sensor 110 may include a pixel array, which includes a plurality of pixels arranged in two dimensions, and a readout circuit. The pixel array may convert optical signals into electrical signals. For example, the pixel array may include a photoelectric conversion element, such as a charge-coupled device (CCD) or a complementary metal-oxide semiconductor (CMOS), or any other kinds of photoelectric conversion elements. The readout circuit may generate raw data based on an electrical signal from the pixel array and output, as an image, the raw data as it is or raw data that underwent preprocessing such as bad pixel removal. The image sensor 110 may be implemented in a semiconductor chip or package including a pixel array and a readout circuit. In some example embodiments, the image sensor 110 may store an image in a memory (not shown).

The ISP 120 may receive an input image. However, embodiments are not limited to those described above, and the ISP 120 may receive an image from a memory (not shown) or may receive an image from an external device (not shown) by communicating with the external device. The input image may include an original image received from the outside. The input image may include an image composed of various color spaces, such as an image composed of red, green, and blue (RGB), an image composed of YUV, or an image composed of HSV.

The ISP 120 may receive an input image, remove noise from the input image, and generate an output image resulting from removing noise from the input image. The output image may be stored in a memory or provided to a peripheral device or an external device.

In some example embodiments, the ISP 120 may include a pyramid generation module 121, a denoising process module 122, and a pyramid reconstruction module 123. Hardware including the pyramid generation module 121, the denoising process module 122, and the pyramid reconstruction module 123 may be designed for each channel in a color space.

The pyramid generation module 121 may generate an image pyramid based on an input image. The image pyramid may refer to a set (or stack) of images hierarchically classified by size, resolution, frequency band, band-pass width, and/or scale. The image pyramid may be divided into plurality of layers. An image of the lowest layer may correspond to an original image. As the layers increase, the size and resolution of images may gradually decrease and the scale of images may gradually increase. Here, that an image of the lowest layer corresponds to an original image may mean that the size and resolution of the image of the lowest layer are the same as those of the original image. The number of layers may be determined by the hardware or designer of the ISP 120 or the like. In some example embodiments, image pyramids may include Gaussian pyramids and Laplacian pyramids. A Gaussian pyramid may be a set of Gaussian images. The ISP 120 may blur a Gaussian image of a lower layer by applying a Gaussian filter to the Gaussian image of the lower layer and may downsample (or subsample) the blurred image, thereby generating a Gaussian image of an upper layer. A Laplacian pyramid may be a set of Laplacian images. The ISP 120 may upsample a Gaussian image of an upper layer that is one level higher than a certain layer (or each layer) and may calculate the difference between the upsampled Gaussian image and a Gaussian image of the certain layer, thereby generating a Laplacian image of the certain layer. Alternatively, the ISP 120 may calculate the difference between a Gaussian image of a layer and a blurred Gaussian image of the layer and generate a Laplacian image of the layer, which includes a residual as a result of the calculation. Here, the residual as the result of the calculation may correspond to the boundary, for example, edge, of an image. The edge of a Laplacian image may appear as a constant luminance value, gain value, or signal magnitude or level. For example, when the size of an original image ranges from 0 to 255, a luminance value, a gain value, or a signal magnitude or level may range from −256 to 255.

The pyramid generation module 121 may generate a Laplacian pyramid and a Gaussian pyramid of an image pyramid based on an input image and output a Gaussian image, which has a scale that is larger than the scale of a Gaussian image of the highest layer of the Gaussian pyramid, by using the Gaussian image of the highest layer. In this case, the scale of the output Gaussian image may be larger than that of the Gaussian image of the highest layer and the size and resolution of the output Gaussian image may be less than those of the Gaussian image of the highest layer.

The denoising process module 122 may receive the Gaussian image output from the pyramid generation module 121. The denoising process module 122 may perform a denoising operation on the Gaussian image to remove noise from the Gaussian image. The denoising process module 122 may output a denoised image. The denoised image may refer to the Gaussian image from which noise has been removed.

The pyramid reconstruction module 123 may receive the Laplacian pyramid and the denoised image. Based on a Laplacian image of each layer, a denoised image of an upper layer that is one level higher than each layer, and edge grade information of the upper layer, the pyramid reconstruction module 123 may generate a denoised image and edge grade information for each layer. Edge grade information may include gain values corresponding to an edge of a Laplacian image. For example, a gain value may be one of 256 values (e.g., 0 to 255). The larger the gain value, the more a pixel corresponding to the gain value may represent an edge. For example, the closer the gain value is to 255, the more likely the corresponding pixel may represent an edge. For example, when the gain value is normalized in a range of 0 to 1, the closer the gain value is to 1, the more likely the corresponding pixel may represent an edge.

Based on a Laplacian image of the lowest layer, a denoised image of a first layer that is one level higher than the lowest layer, and edge grade information or the first layer, the pyramid reconstruction module 123 may generate an output image. The pyramid reconstruction module 123 may output the output image.

According to some example embodiments described above, noise reduction performance may be increased by removing noise from an image by using information of an adjacent layer in an image pyramid.

In addition, the loss of edge information may be reduced by performing an operation of reconstructing an image pyramid and an operation of denoising the image pyramid together.

Figure 2:
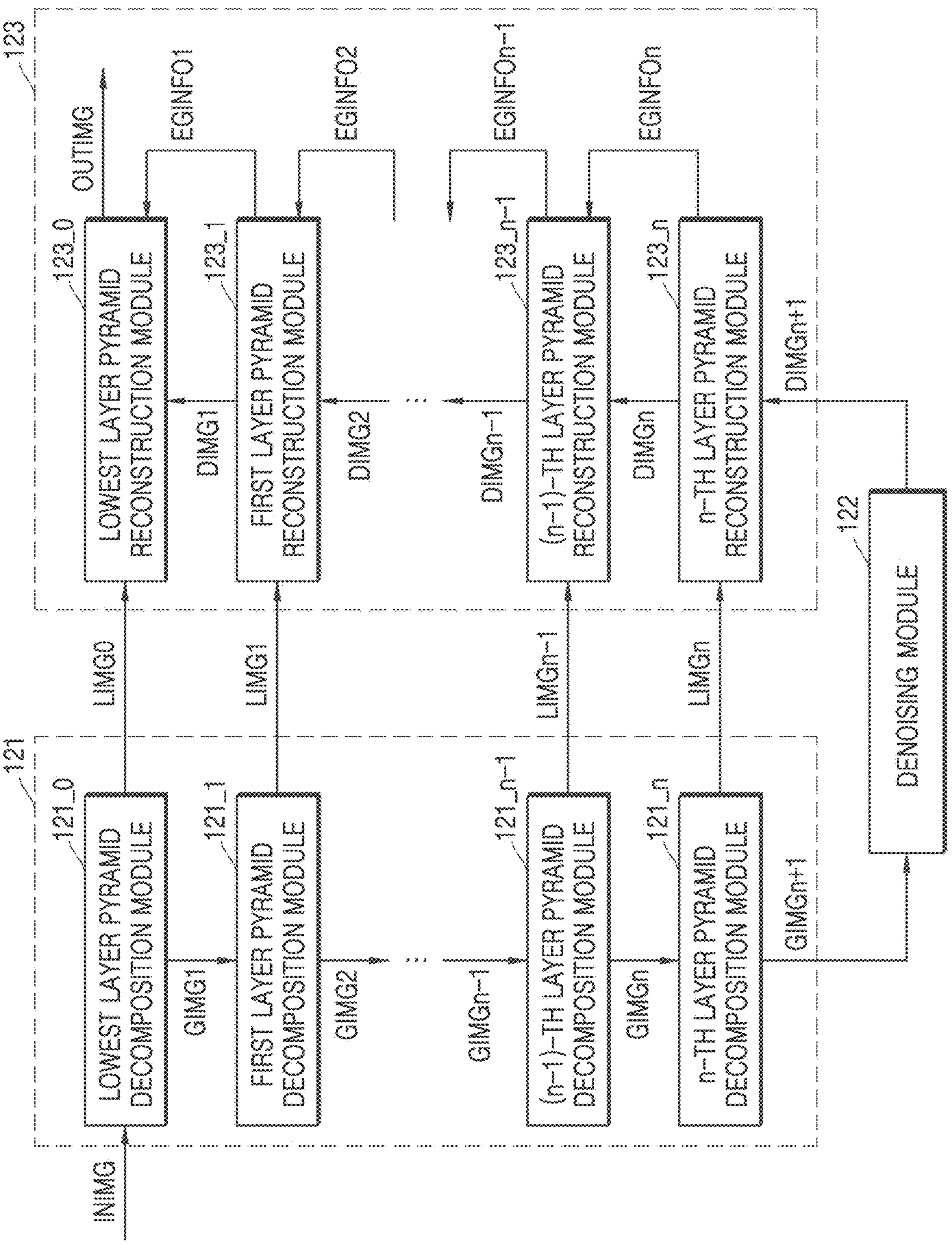
FIG. 2 is a block diagram of an image signal processor (ISP) according to some example embodiments.

FIG. 2 is a block diagram of the ISP 120 according to some example embodiments.

Referring to FIG. 2, the pyramid generation module 121, the denoising process module 122, and the pyramid reconstruction module 123 may communicate with one another in on-the-fly (OTF) mode.

In some example embodiments, the pyramid generation module 121 of the ISP 120 may include a plurality of pyramid decomposition modules (e.g., 121_0 to 121_*n*). Here, "n" may be an integer of at least 2.

A lowest layer pyramid decomposition module 121_0 may generate a first layer Gaussian image GIMG1 and a lowest layer Laplacian image LIMG0, based on an input image INIMG. The lowest layer pyramid decomposition module 121_0 means a pyramid decomposition module of the lowest layer. The first layer Gaussian image GIMG1 means a Gaussian image of the first layer. The lowest layer Laplacian image LIMG0 means a Laplacian image of the lowest layer. Hereinafter an element of a random layer is referred to the random layer element. For example, the lowest layer pyramid decomposition module 121_0 may blur the input image INIMG and generate the first layer Gaussian image GIMG1 by downsampling a blurred image. The lowest layer pyramid decomposition module 121_0 may upsample the first layer Gaussian image GIMG1 and generate the lowest layer Laplacian image LIMG0 by calculating the difference between an upsampled Gaussian image and the input image INIMG. Alternatively, the lowest layer pyramid decomposition module 121_0 may generate the lowest layer Laplacian image LIMG0 by calculating the input image INIMG and the blurred image. The input image INIMG may correspond to a Gaussian image of the lowest layer. The first layer may be one level higher than the lowest layer. The first layer Gaussian image GIMG1 may be input to a first layer pyramid decomposition module 121_1. The lowest layer Laplacian image LIMG0 may be input to a lowest layer pyramid reconstruction module 123_0.

The first layer pyramid decomposition module 121_1 may generate a second layer Gaussian image GIMG2 and a first layer Laplacian image LIMG1, based on the first layer Gaussian image GIMG1. For example, the first layer pyramid decomposition module 121_1 may blur the first layer Gaussian image GIMG1 and generate the second layer Gaussian image GIMG2 by downsampling a blurred image. The first layer pyramid decomposition module 121_1 may upsample the second layer Gaussian image GIMG2 and generate the first layer Laplacian image LIMG1 by calculating the difference between an upsampled Gaussian image and the first layer Gaussian image GIMG1. The second layer may be one level higher than the first layer. As described above, it is assumed here that an (m+1)-th layer is one level higher than an m-th layer. In this case, "m" may be an integer that is greater than 0 and less than "n". The second layer Gaussian image GIMG2 may be input to a second layer pyramid decomposition module (not shown). The first layer Laplacian image LIMG1 may be input to a first layer pyramid reconstruction module 123_1.

As described above, a pyramid decomposition module of each of the second to (n−2)-th layers may generate a Laplacian image of each layer and a Gaussian image of an upper layer that is one level higher than each layer, based on a Gaussian image of a lower layer that is one level lower than each layer. Similarly, an (n−1)-th layer pyramid decomposition module 121_*n*−1 may generate an n-th layer Gaussian image GIMGn and an (n−1)-th layer Laplacian image LIMGn−1, based on an (n−1)-th layer Gaussian image GIMGn−1. An n-th layer pyramid decomposition module 121_*n* may generate a highest layer Gaussian image GIMGn+1 and an n-th layer Laplacian image LIMGn, based on the n-th layer Gaussian image GIMGn. In some example embodiments, a plurality of pyramid decomposition modules (e.g., 121_0 to 121_*n*) may include a downscaler and an upscaler. Here, a method of denoising an image by using a Laplacian image and a Gaussian image of each layer may be referred to as a multi-scaling denoising method. According to the multi-scaling denoising method, when filters of the same size are used in all layers, there is an effect of using a larger filter as a layer increases.

In some example embodiments, the denoising process module 122 of the ISP 120 may receive the highest layer Gaussian image GIMGn+1. The denoising process module 122 may remove noise from the highest layer Gaussian image GIMGn+1 by performing a denoising operation. For example, the denoising process module 122 may remove noise from the highest layer Gaussian image GIMGn+1 by applying a noise filter to the highest layer Gaussian image GIMGn+1. Here, the noise filter may include various spatial filters, such as an averaging filter, a Gaussian filter, a sharpening filter, a median filter, a non-local means (NLM) filter, and a deep learning filter. The denoising process module 122 may output a highest layer denoised image DIMGn+1. The highest layer denoised image DIMGn+1 may refer to an image obtained by removing noise from the highest layer Gaussian image GIMGn+1.

In some example embodiments, the pyramid reconstruction module 123 of the ISP 120 may receive a Laplacian pyramid and the highest layer denoised image DIMGn+1. Based on a Laplacian image of each layer, a denoised image of a layer that is one level higher than each layer, and edge grade information of the layer, the pyramid reconstruction module 123 may sequentially generate a denoised image and edge grade information for each layer.

The pyramid reconstruction module 123 may restore an original image without loss of information through a pyramid reconstruction process and may restore the original image by using images denoised at different intensities for different layers.

In some example embodiments, the pyramid reconstruction module 123 may include a plurality of pyramid reconstruction modules (e.g., 123_0 to **123_*n***)

An n-th layer pyramid reconstruction module **123_*n* may receive the n-th layer Laplacian image LIMGn and the highest layer (e.g., the (n+1)-th layer) denoised image DIMGn+1. Based on the n-th layer Laplacian image LIMGn and the highest layer Gaussian image GIMGn+1, the n-th layer pyramid reconstruction module 123_*n* may output an n-th layer denoised image DIMGn and n-th layer edge grade information EGINFOn. The n-th layer edge grade information EGINFOn may include gain values corresponding to the edge of the n-th layer Laplacian image LIMGn. Here, the n-th layer pyramid reconstruction module 123_*n*** may be referred to as a top reconstruction module.

An (n−1)-th layer pyramid reconstruction module **123_*n*−1 may receive the (n−1)-th layer Laplacian image LIMGn−1, the n-th layer denoised image DIMGn, and the n-th layer edge grade information EGINFOn. Based on the (n−1)-th layer Laplacian image LIMGn−1, the n-th layer denoised image DIMGn, and the n-th layer edge grade information EGINFOn, the (n−1)-th layer pyramid reconstruction module 123_*n*−1** may output an (n−1)-th layer denoised image DIMGn−1 and (n−1)-th layer edge grade information EGINFOn−1.

As described above, a pyramid reconstruction module of each of the first to (n−2)-th layers may receive a denoised image of an upper layer that is one level higher than each layer, edge grade information of the upper layer, and a Laplacian image of each layer and may output a denoised image and edge grade information for each layer. Here, the pyramid reconstruction module of each of the first to (n−2)-th layers may be referred to as a middle reconstruction module. In some embodiments, edge grade information of a selected layer may be provided to a pyramid reconstruction module of a lower layer, and edge grade information of an unselected layer may not be provided to a pyramid reconstruction module of a lower layer.

A lowest layer pyramid reconstruction module 123_0 may receive the lowest layer Laplacian image LIMG0, a first layer denoised image DIMG1, and first layer edge grade information EGINFO1 and may output an output image OUTIMG. Here, the lowest layer pyramid reconstruction module 123_0 may be referred to as a bottom reconstruction module.

According to some example embodiments described above, the performance of a noise reduction operation may be increased by removing noise from an image by using information of adjacent layers in an image pyramid.

In addition, a clear image may be provided by increasing denoising performance even in an environment in which it is difficult to distinguish information about an edge from information about noise in a Laplacian image of each of the lowest layer and the first layer.

Furthermore, the loss of information about an edge may be reduced and denoising performance may be increased, by accurately identifying the edge of a Laplacian image captured in a low-light environment.

For example, according to some example embodiments, there may be an increase in speed, accuracy, and/or power efficiency of the image processing device based on the above denoising methods. Therefore, the improved devices and methods overcome the deficiencies of the conventional devices and methods of denoising data while reducing resource consumption, and improving data accuracy, and resource allocation (e.g., latency). Further, there is an improvement in user experience and image capture in the device by providing the improved denoising.

Figure 3:
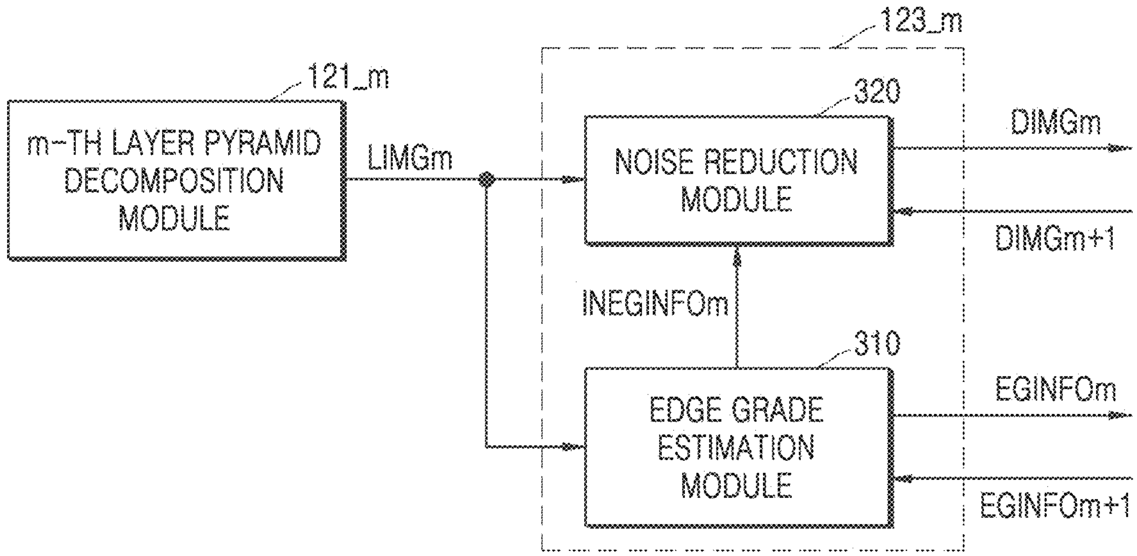
FIG. 3 is a block diagram illustrating a pyramid decomposition module and a pyramid reconstruction module in a random layer, according to some example embodiments.

FIG. 3 is a block diagram illustrating a pyramid decomposition module and a pyramid reconstruction module in a random layer, according to some example embodiments. In FIG. 3, the random layer is assumed to be an m-th layer.

Referring to FIG. 3, in some example embodiments, an m-th layer pyramid reconstruction module **123_*m* may reconstruct an image pyramid and perform a denoising operation together (or simultaneously), for example, at or almost at a same time, thereby removing noise in each frequency band. The m-th layer pyramid reconstruction module 123_*m*** may remove noise from an image by performing noise reduction using information of adjacent layers in a process of reconstructing an image pyramid.

In some example embodiments, the m-th layer pyramid reconstruction module **123_*m* may receive an m-th layer Laplacian image LIMGm from an m-th layer pyramid decomposition module 121_*m*. The m-th layer pyramid reconstruction module 123_*m* may include an edge grade estimation module 310 and a noise reduction module 320**.

The edge grade estimation module 310 may receive the m-th layer Laplacian image LIMGm and (m+1)-th layer edge grade information EGINFOm+1. The edge grade estimation module 310 may output m-th layer edge grade information EGINFOm based on the m-th layer Laplacian image LIMGm. The edge grade estimation module 310 may estimate m-th layer inner edge grade information INEGINFOm based on the m-th layer Laplacian image LIMGm and the (m+1)-th layer edge grade information EGINFOm+1. In the case of edge grade information of an upper layer that is higher than a current layer, the influence of noise may be relatively small. Accordingly, an edge of a Laplacian image of the current layer may be estimated using the edge grade information of the upper layer. For example, the edge grade estimation module 310 may estimate an edge of a Laplacian image of each of the lowest and first layers, which have relatively high noise, by using edge grade information of an upper layer. Here, the edge grade estimation module 310 may be referred to as an edge grade estimator.

The noise reduction module 320 may receive the m-th layer Laplacian image LIMGm, the m-th layer inner edge grade information INEGINFOm, and an (m+1)-th layer denoised image DIMGm+1. Based on the m-th layer inner edge grade information INEGINFOm, the noise reduction module 320 may perform a denoising operation on the m-th layer Laplacian image LIMGm and an m-th layer Gaussian image. The m-th layer Gaussian image maybe restored based on the (m+1)-th layer denoised image DIMGm+1 and an m-th layer Laplacian image. The noise reduction module 320 may output an m-th layer denoised image DIMGm based on results of the denoising operation and the m-th layer inner edge grade information INEGINFOm. In some example embodiments, a denoising algorithm that may be used in the noise reduction module 320 may include a spatial filtering method such as NLM filtering. For example, the noise reduction module 320 may calculate similarity according to a PxP pattern mask within a search range of N×N through pattern matching with respect to the m-th layer Laplacian image LIMGm, calculate a weight based on the similarity, calculate a weighted average value within the search range of N×N based on the weight, and output a denoised result corresponding to the weighted average value.

Figure 4:
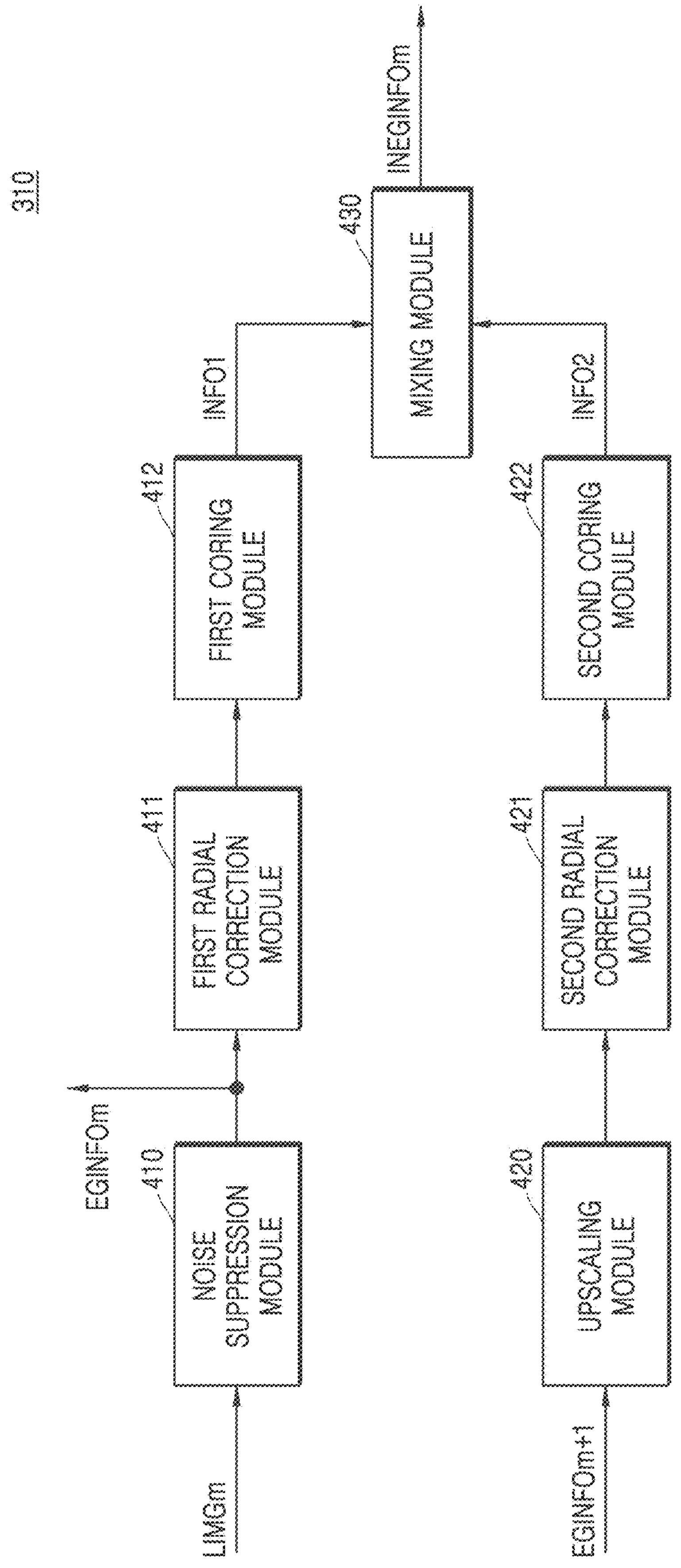
FIG. 4 is a block diagram of an edge grade estimation module according to some example embodiments.

FIG. 4 is a block diagram of the edge grade estimation module 310 according to some example embodiments.

Referring to FIG. 4, the edge grade estimation module 310 may include a noise suppression module 410, a first radial correction module 411, a first coring module 412, an upscaling module 420, a second radial correction module 421, a second coring module 422, and a mixing module 430.

The noise suppression module 410 may remove noise from the m-th layer Laplacian image LIMGm. The noise suppression module 410 may output, as the m-th layer edge grade information EGINFOm, information, which includes gain values of a noise-removed Laplacian image, to an edge grade estimation module (not shown) of a lower layer. For example, a denoising algorithm that may be used in the noise suppression module 410 may include Gaussian filtering. For example, the noise suppression module 410 may denoise the m-th layer Laplacian image LIMGm by using Gaussian filtering.

The first radial correction module 411 may adjust or normalize the level of signals, which constitute the noise-removed Laplacian image, according to a radial direction. For example, the first radial correction module 411 may differently set the intensity of a Gaussian filter according to a radial direction and may increase the sigma value of the Gaussian filter as the level or gain value of a signal increases. The first radial correction module 411 may output an adjusted Laplacian image to the first coring module 412.

The first coring module 412 may remove a signal in a first threshold level range from among the signals constituting the adjusted Laplacian image and may detect a signal outside the first threshold level range in the signals constituting the adjusted Laplacian image. For example, the first coring module 412 may detect, as an edge component, a component of a signal, which reduces the influence of noise and has at least a certain level, among the signals constituting the adjusted Laplacian image. The first coring module 412 may output, to the mixing module 430, first information INFO1 including signals outside the first threshold level range.

The upscaling module 420 may upscale the fine edge of edge grade information of the (m+1)-th layer. The edge grade information of the (m+1)-th layer may be output from an edge grade estimation module (not shown) in an upper layer. The fine edge of the edge grade information of the (m+1)-th layer may correspond to gain values of a Laplacian image obtained by denoising the Laplacian image of the (m+1)-th layer. For example, the upscaling module 420 may increase the resolution of the edge grade information of the (m+1)-th layer such that the resolution of the edge grade information of the (m+1)-th layer matches the resolution of a Laplacian image of the m-th layer. The upscaling module 420 may output the upscaled edge grade information to the second radial correction module 421.

The second radial correction module 421 may adjust the levels of the upscaled edge grade information according to the radial direction. The second radial correction module 421 may output the adjusted edge grade information to the second coring module 422. The operation of the second radial correction module 421 may be the same as that of the first radial correction module 411.

The second coring module 422 may remove a level within a second threshold level range from the levels of the adjusted edge grade information and may detect a level outside the second threshold level range. The second coring module 422 may output, to the mixing module 430, second information INFO2 including levels outside the second threshold level range. The edge of the second information INFO2 may be referred to as a coarse edge. The operation of the second coring module 422 may be the same as that of the first coring module 412.

The mixing module 430 may combine the first information INFO1 with the second information INFO2 and may output combined edge grade information as the m-th layer inner edge grade information INEGINFOm. For example, combining the first information INFO1 with the second information INFO2 may include selecting a greater level between a level of the first information INFO1 and a level of the second information INFO2 for one pixel position. Accordingly, the combined edge grade information may include gain values corresponding to greater levels between the first information INFO1 and the second information INFO2. When pieces of edge grade information of different layers are combined, more robust edge grade information may be generated.

Figure 5:
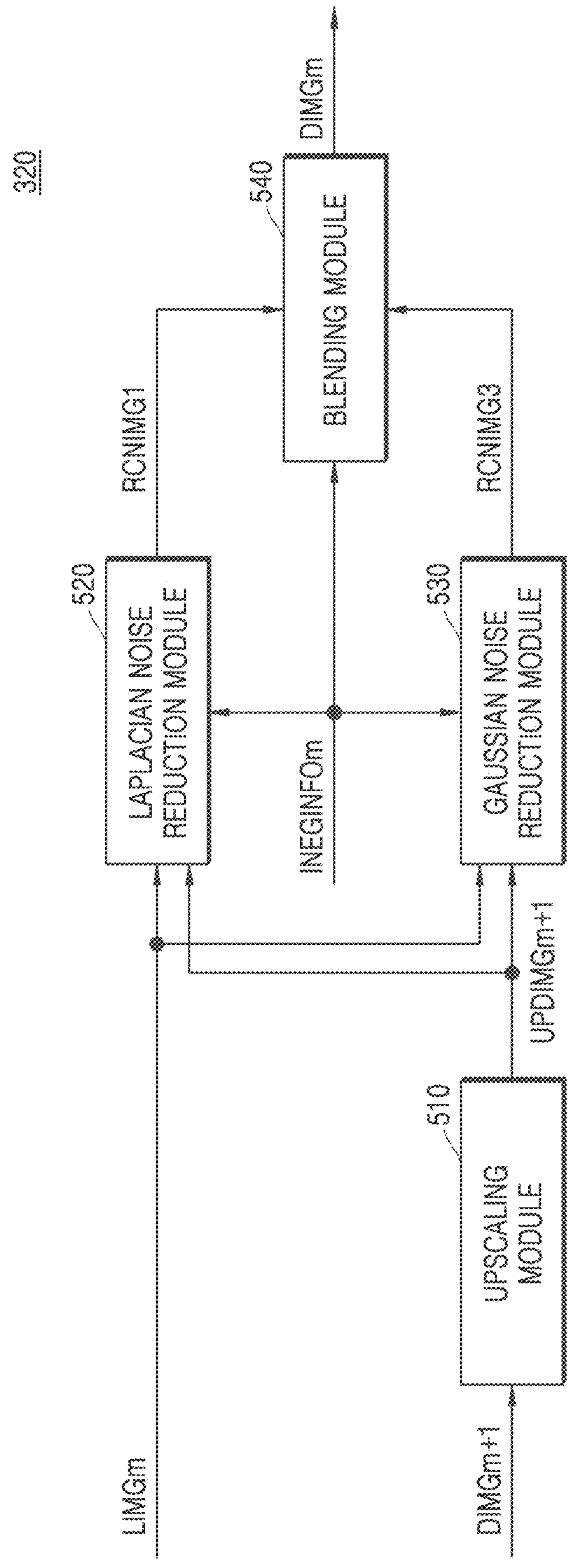
FIG. 5 is a block diagram of a noise reduction module according to some example embodiments.

FIG. 5 is a block diagram of the noise reduction module 320 according to some example embodiments.

Referring to FIG. 5, the noise reduction module 320 may perform a noise reduction operation on a Laplacian image before pyramid reconstruction, perform a noise reduction operation on a Gaussian image after the pyramid reconstruction, and blend two results of the noise reduction operations through inner edge information. In some example embodiments, the noise reduction module 320 may include an upscaling module 510, a Laplacian noise reduction module 520, a Gaussian noise reduction module 530, and a blending module 540.

The upscaling module 510 may upscale the (m+1)-th layer denoised image DIMGm+1 and output an upscaled denoised image UPDIMGm+1 to the Laplacian noise reduction module 520 and the Gaussian noise reduction module 530. The operation of the upscaling module 510 may be the same as the upscaling module 420 described above with reference to FIG. 4.

The Laplacian noise reduction module 520 may receive the m-th layer Laplacian image LIMGm, the upscaled denoised image UPDIMGm+1, and the m-th layer inner edge grade information INEGINFOm. The Laplacian noise reduction module 520 may output a first reconstructed image RCNIMG1 to the blending module 540. Information about an edge of the m-th layer Laplacian image LIMGm is relatively insufficient compared to a Gaussian image. The Laplacian noise reduction module 520 may adjust a denoising intensity by performing a noise reduction operation on the frequency band of a current layer.

In some example embodiments, the Laplacian noise reduction module 520 may selectively not receive the upscaled denoised image UPDIMGm+1.

The Gaussian noise reduction module 530 may receive the m-th layer Laplacian image LIMGm, the upscaled denoised image UPDIMGm+1, and the m-th layer inner edge grade information INEGINFOm. The Gaussian noise reduction module 530 may output a third reconstructed image RCNIMG3, which is obtained by reducing noise in a second reconstructed image, to the blending module 540. Information about an edge of the upscaled denoised image UPDIMGm+1, for example, a Gaussian image, is relatively sufficient compared to a Laplacian image. The Gaussian noise reduction module 530 may perform a noise reduction operation on the whole frequency band of an upper layer.

In some example embodiments, the Gaussian noise reduction module 530 may selectively not receive the m-th layer inner edge grade information INEGINFOm.

The blending module 540 may combine the first reconstructed image RCNIMG1 with the third reconstructed image RCNIMG3 based on the m-th layer inner edge grade information INEGINFOm. Gain values of the m-th layer inner edge grade information INEGINFOm may be used as weights. For example, as a gain value of a certain pixel is closer to 255 (or as a normalized gain value of a certain pixel is closer to 1), a rate at which the signal level of the third reconstructed image RCNIMG3 is applied to the certain pixel may increase. As a gain value of a certain pixel is closer to 0, a rate at which the signal level of the first reconstructed image RCNIMG1 is applied to the certain pixel may increase. As a gain value of a certain pixel is closer to a median value between 0 and 255 (or as a normalized gain value of a certain pixel is closer to a median value between 0 and 1), the signal level of the first reconstructed image RCNIMG1 and the signal level of the third reconstructed image RCNIMG3 may be applied to the certain pixel at almost the same ratio. The blending module 540 may output a combined image as the m-th layer denoised image DIMGm.

Figure 6:
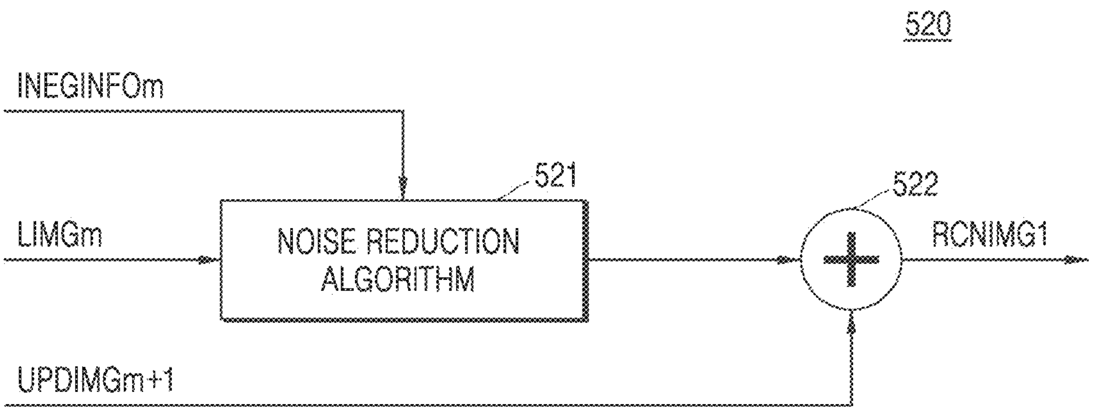
FIG. 6 is a block diagram of a Laplacian noise reduction module according to some example embodiments.

FIG. 6 is a block diagram of the Laplacian noise reduction module 520 according to some example embodiments.

Referring to FIGS. 5 and 6, the Laplacian noise reduction module 520 may denoise the m-th layer Laplacian image LIMGm based on the m-th layer inner edge grade information INEGINFOm. For example, like a denoising algorithm, a noise reduction algorithm 521 may include a spatial filtering method, such as Gaussian filtering or NLM filtering. Noise reduction performance may be increased by using the m-th layer inner edge grade information INEGINFOm.

Thereafter, the Laplacian noise reduction module 520 may generate the first reconstructed image RCNIMG1, based on a noise-reduced Laplacian image and the upscaled denoised image UPDIMGm+1. For example, the Laplacian noise reduction module 520 may generate the first reconstructed image RCNIMG1 by performing an addition 522 (or reconstruction) on the noise-reduced Laplacian image and the upscaled denoised image UPDIMGm+1. The Laplacian noise reduction module 520 may output the first reconstructed image RCNIMG1 to the blending module 540.

In some example embodiments, the noise reduction algorithm 521 may be omitted from the Laplacian noise reduction module 520, and a reconstructed image obtained after the reconstruction (e.g., the addition 522), may be output to the blending module 540.

Figure 7:
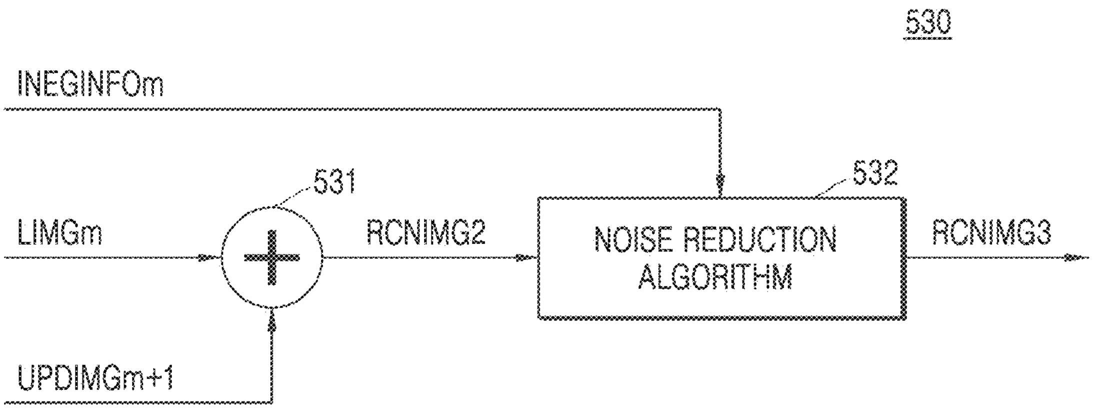
FIG. 7 is a block diagram of a Gaussian noise reduction module according to some example embodiments.

FIG. 7 is a block diagram of the Gaussian noise reduction module 530 according to some example embodiments.

Referring to FIGS. 5 and 7, the Gaussian noise reduction module 530 may generate a second reconstructed image RCNIMG2, based on the m-th layer Laplacian image LIMGm and the upscaled denoised image UPDIMGm+1. For example, the Gaussian noise reduction module 530 may generate the second reconstructed image RCNIMG2 by performing an addition 531 (or reconstruction) on the m-th layer Laplacian image LIMGm and the upscaled denoised image UPDIMGm+1.

Thereafter, the Gaussian noise reduction module 530 may denoise the second reconstructed image RCNIMG2 based on the m-th layer inner edge grade information INEGINFOm. For example, a noise reduction algorithm 532 may include the NLM filtering described above. Noise reduction performance may be increased by using the m-th layer inner edge grade information INEGINFOm. The Gaussian noise reduction module 530 may output the third reconstructed image RCNIMG3 to the blending module 540.

In some example embodiments, the noise reduction algorithm 532 may be omitted from the Gaussian noise reduction module 530, and a reconstructed image resulting from the addition 531 may be output to the blending module 540.

Figure 8:
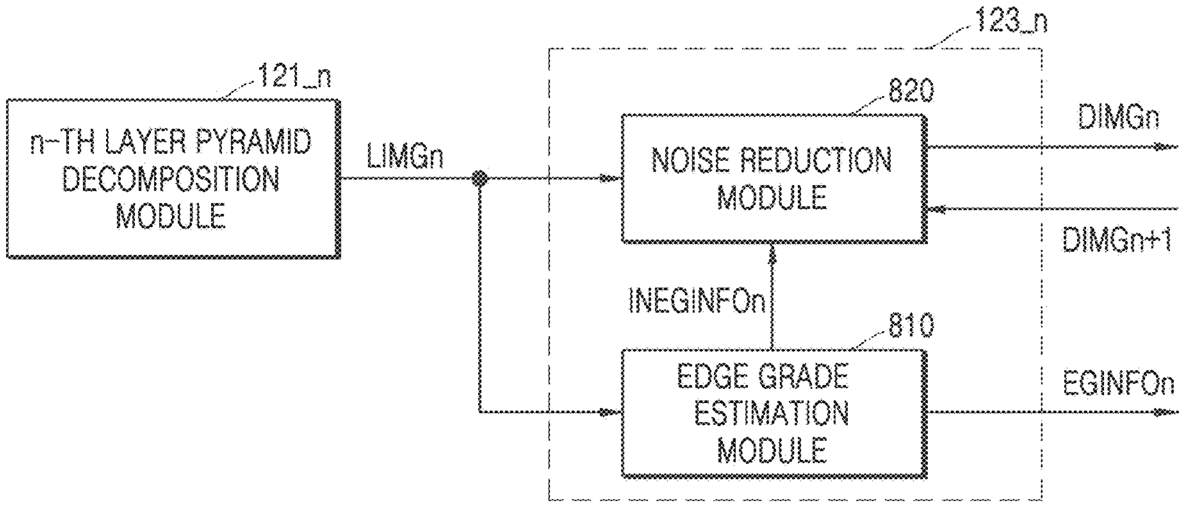
FIG. 8 is a block diagram of a top reconstruction module according to some example embodiments.

FIG. 8 is a block diagram of a top reconstruction module according to some example embodiments.

Referring to FIG. 8, the n-th layer pyramid reconstruction module 123_*n* as the top reconstruction module may receive the n-th layer Laplacian image LIMGn from the n-th layer pyramid decomposition module 121_*n*. The n-th layer pyramid reconstruction module 123_*n* may include an edge grade estimation module 810 and a noise reduction module 820.

The edge grade estimation module 810 may estimate the n-th layer edge grade information EGINFOn and n-th layer inner edge grade information INEGINFOn based on the n-th layer Laplacian image LIMGn. The operation of the edge grade estimation module 810 may be similar to that of the edge grade estimation module 310 in FIG. 3. In some example embodiments, the edge grade estimation module 810 may include the noise suppression module 410, the first radial correction module 411, and the first coring module 412 in FIG. 4. The edge grade estimation module 810 may further include the mixing module 430 in FIG. 4.

The noise reduction module 820 may perform a denoising operation on the n-th layer Laplacian image LIMGn and the highest layer denoised image DIMGn+1, based on the n-th layer inner edge grade information INEGINFOn. The noise reduction module 820 may output the n-th layer denoised image DIMGn to the (n−1)-th layer pyramid reconstruction module 123_*n*−1, based on results of the denoising operation and the n-th layer inner edge grade information INEGINFOn. The operation of the noise reduction module 820 may be similar to that of the noise reduction module 320 in FIG. 3. In some example embodiments, the noise reduction module 820 may include the upscaling module 510, the Laplacian noise reduction module 520, the Gaussian noise reduction module 530, and the blending module 540 in FIG. 5.

Figure 9:
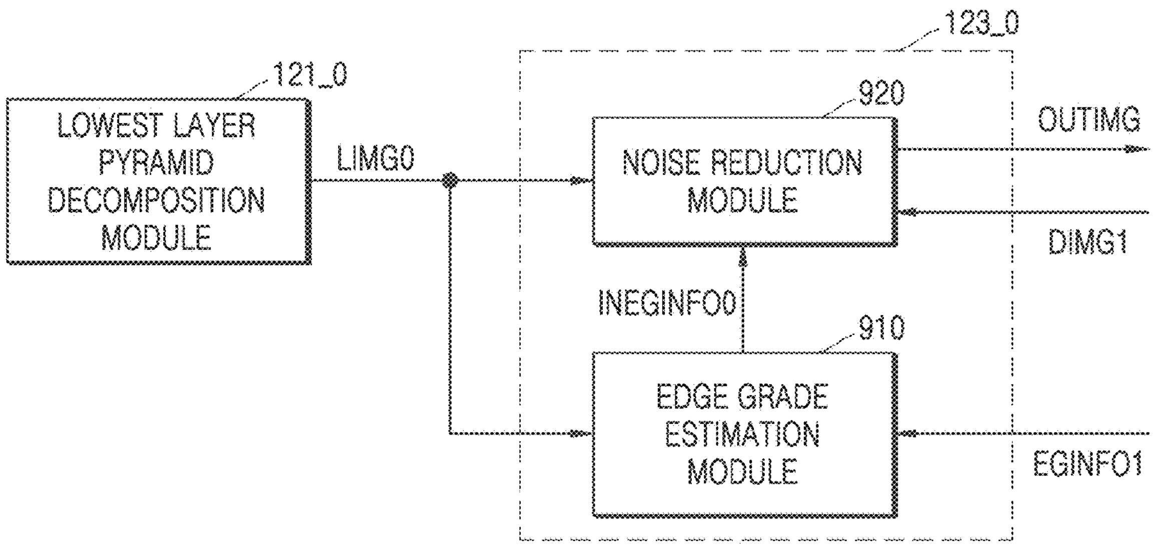
FIG. 9 is a block diagram of a bottom reconstruction module according to some example embodiments.

FIG. 9 is a block diagram of a bottom reconstruction module according to some example embodiments.

Referring to FIG. 9, the lowest layer pyramid reconstruction module 123_0 as the bottom reconstruction module may receive the lowest layer Laplacian image LIMG0 from the lowest layer pyramid decomposition module 121_0. The lowest layer pyramid reconstruction module 123_0 may include an edge grade estimation module 910 and a noise reduction module 920.

The edge grade estimation module 910 may estimate lowest layer inner edge grade information INEGINFO0 based on the lowest layer Laplacian image LIMG0 and the first layer edge grade information EGINFO1. The operation of the edge grade estimation module 910 may be similar to that of the edge grade estimation module 310 in FIG. 3. In some example embodiments, the edge grade estimation module 910 may include the noise suppression module 410, the first radial correction module 411, and the first coring module 412, the upscaling module 420, the second radial correction module 421, the second coring module 422, and the mixing module 430 in FIG. 4.

The noise reduction module 920 may perform a denoising operation on the lowest layer Laplacian image LIMG0 and the first layer denoised image DIMG1, based on the lowest layer inner edge grade information INEGINFO0. The noise reduction module 920 may output the output image OUTIMG, based on results of the denoising operation and the lowest layer inner edge grade information INEGINFO0. The operation of the noise reduction module 920 may be similar to that of the noise reduction module 320 in FIG. 3. In some example embodiments, the noise reduction module 920 may include the upscaling module 510, the Laplacian noise reduction module 520, the Gaussian noise reduction module 530, and the blending module 540 in FIG. 5.

Figure 10:
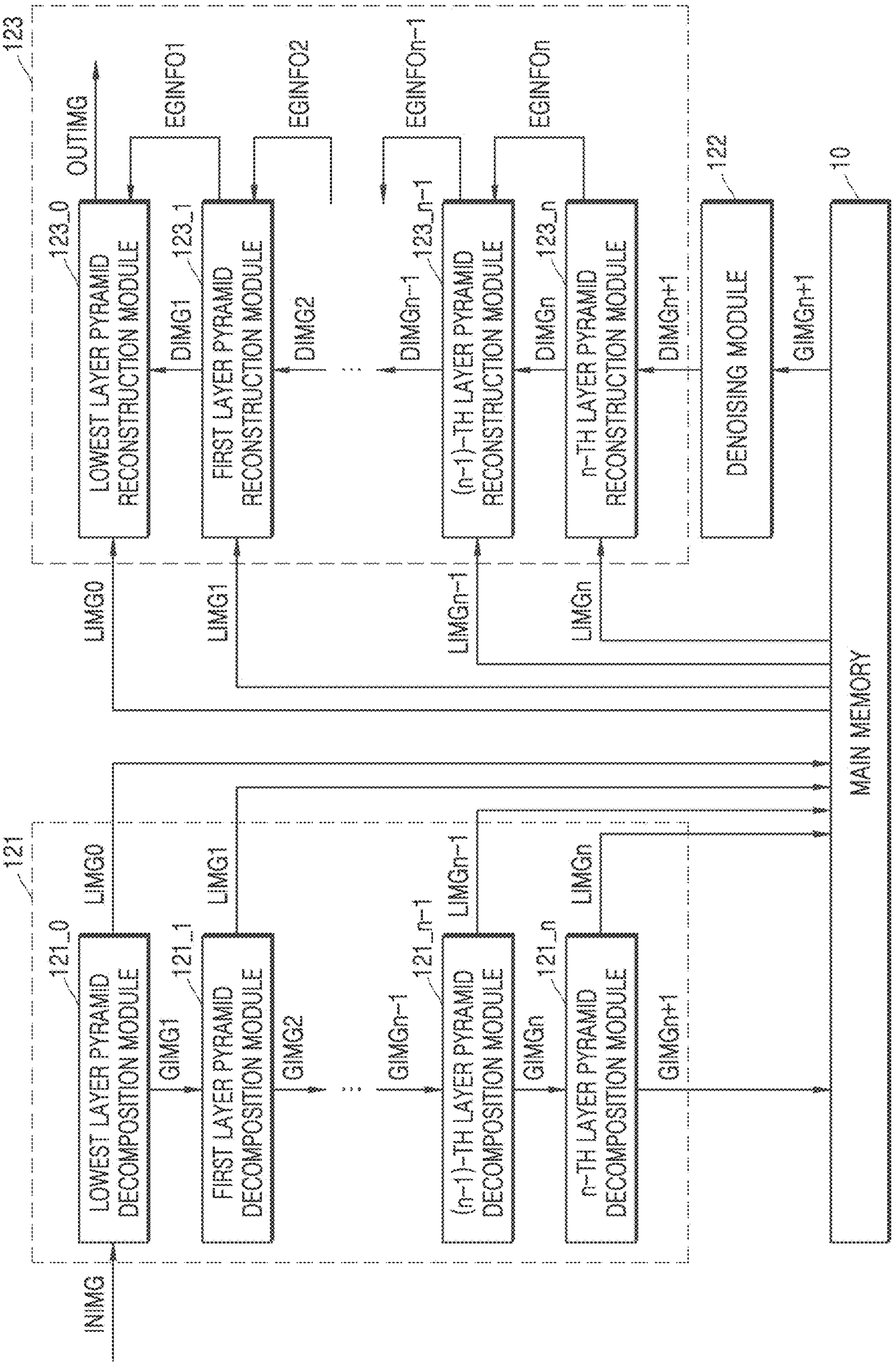
FIG. 10 is a block diagram showing an ISP and a main memory, according to some example embodiments.

FIG. 10 is a block diagram showing an ISP and a main memory, according to some example embodiments.

Referring to FIG. 10, a Laplacian pyramid (e.g., LIMG0, LIMG1, . . . , LIMGn−1, and LIMGn) and the highest layer Gaussian image GIMGn+1, which are output from the pyramid generation module 121, may be stored in a main memory 10. For example, the main memory 10 may include volatile memory, such as static random access memory (SRAM), dynamic RAM (DRAM), or synchronous DRAM (SDRAM). However, embodiments are not limited to those mentioned above. The denoising process module 122 may receive the highest layer Gaussian image GIMGn+1 stored in the main memory 10. The pyramid reconstruction module 123 may receive the Laplacian pyramid stored in the main memory 10. The operations of the pyramid generation module 121, the denoising process module 122, and the pyramid reconstruction module 123 are the same as those described above with reference to FIG. 2.

Figure 11:
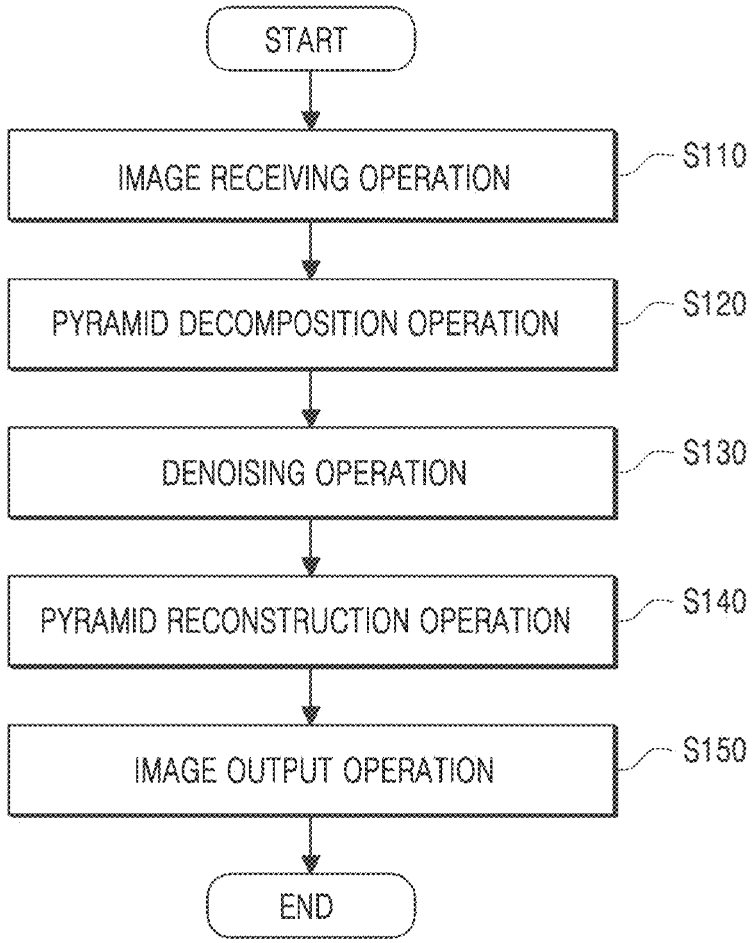
FIG. 11 is a flowchart of an operating method of a processor, according to some example embodiments.

FIG. 11 is a flowchart of an operating method of a processor, according to some example embodiments.

The processor performing the operating method of FIG. 11 may include the ISP 120 in FIG. 1. The operating method of FIG. 11 may include an image receiving operation S110, a pyramid decomposition operation S120, a denoising operation S130, a pyramid reconstruction operation S140, and an image output operation S150.

In the image receiving operation S110, the processor may receive an input image.

In the pyramid decomposition operation S120, the processor may generate an image pyramid and a highest Gaussian image of the highest layer, based on the input image. For example, the highest Gaussian image may correspond to the highest layer Gaussian image GIMGn+1 in FIG. 2.

In the denoising operation S130, the processor may generate a highest denoised image by denoising the highest Gaussian image. The highest denoised image may refer to a Gaussian image obtained by removing noise from the highest Gaussian image. For example, the highest denoised image may correspond to the highest layer denoised image DIMGn+1 in FIG. 2.

In the pyramid reconstruction operation S140, the processor may generate a denoised image and edge grade information for each of the layers of the image pyramid sequentially from the highest layer to the first layer, based on a Laplacian image of each layer in a Laplacian pyramid of the image pyramid, a denoised image of an upper layer that is one level higher than each layer, and edge grade information of the upper layer, wherein the edge grade information of the upper layer includes gain values corresponding to the edge of an Laplacian image of the upper layer. The pyramid reconstruction operation S140 may correspond to the operation of each of the plurality of pyramid reconstruction modules (for example, 123_0 to 123_*n*) in FIG. 10.

In some example embodiments, the denoising operation S130 may be performed together (e.g., simultaneously, at or almost at the same time) with the pyramid reconstruction operation S140. However, embodiments are not limited thereto.

In the image output operation S150, the processor may output an output image, based on a Laplacian image of the lowest layer that is below the first layer, a denoised image of the first layer, and edge grade information of the first layer. The output image may then be stored in a memory (not shown) and/or displayed.

In some example embodiments, the operating method of FIG. 11 may further include a data writing operation and a data reading operation. In the data wiring operation, the processor may control a main memory to store the Laplacian pyramid and the highest Gaussian image in the main memory. For example, the processor may provide a write command, an address, the Laplacian pyramid, and the highest Gaussian image to the main memory. In the data reading operation, the processor may control the main memory to read the Laplacian pyramid and the highest Gaussian image from the main memory. For example, the processor may provide a read command and an address to the main memory and receive the Laplacian pyramid and the highest Gaussian image from the main memory.

Figure 12:
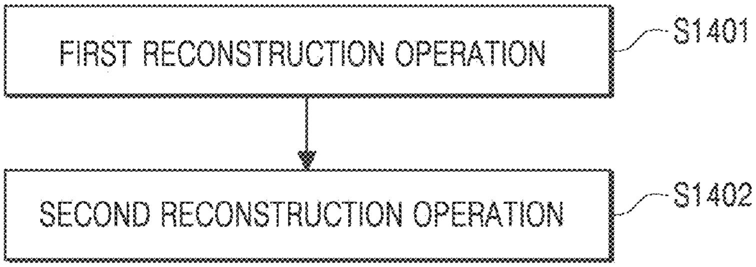
FIG. 12 is a flowchart of an example of operation S140 in FIG. 11.

FIG. 12 is a flowchart of an example of the pyramid reconstruction operation S140 in FIG. 11.

Referring to FIG. 12, the pyramid reconstruction operation S140 may include a first reconstruction operation S1401 and a second reconstruction operation S1402.

In the first reconstruction operation S1401, the processor may generate an n-th denoised image and n-th edge grade information for an n-th layer, based on an n-th Laplacian image of the n-th layer and the highest denoised image. Here, "n" may be an integer of at least 2. For example, the n-th Laplacian image may correspond to the n-th layer Laplacian image LIMGn in FIG. 2, the n-th denoised image may correspond to the n-th layer denoised image DIMGn in FIG. 2, and the n-th edge grade information may correspond to the n-th layer edge grade information EGINFOn in FIG. 2. The first reconstruction operation S1401 may be the same as the operation of the top reconstruction module (e.g., 123_*n*) described above with reference to FIG. 2.

In the second reconstruction operation S1402, the processor may generate an m-th denoised image and m-th edge grade information for an m-th layer, based on an m-th Laplacian image of the m-th layer, an (m+1)-th denoised image of an (m+1)-th layer, and (m+1)-th edge grade information of the (m+1)-th layer. Here, "m" is a natural number that is less than "n". For example, the second reconstruction operation S1402 may be the same as the operation of a middle reconstruction module (e.g., 123_1, . . . , or 123_*n*−1) described above with reference to FIG. 2.

Figure 13:
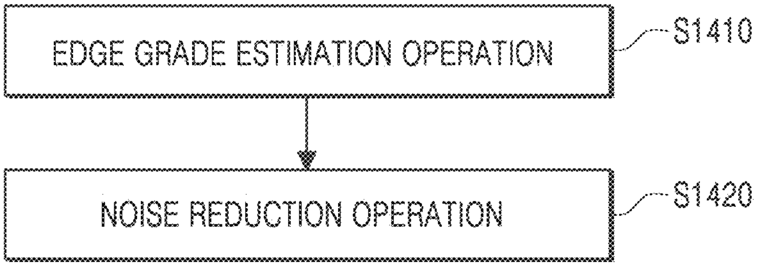
FIG. 13 is a flowchart illustrating an example of each operation in FIG. 12.

FIG. 13 is a flowchart illustrating an example of each operation in FIG. 12.

Referring to FIGS. 12 and 13, some example embodiments of FIG. 13 may be included in the first reconstruction operation S1401 and/or the second reconstruction operation S1402 in FIG. 12.

In some example embodiments, the second reconstruction operation S1402 may include an edge grade estimation operation S1410 and a noise reduction operation S1420.

In the edge grade estimation operation S1410, the processor may estimate the m-th edge grade information and inner edge grade information of the m-th layer, based on the m-th Laplacian image and the (m+1)-th edge grade information. According to some example embodiments, the edge grade estimation operation S1410 may be the same as the operation of the edge grade estimation module 310 described above with reference to FIG. 3.

In the noise reduction operation S1420, the processor may generate the m-th denoised image, based on the m-th Laplacian image, the (m+1)-th denoised image, and the inner edge grade information. According to some example embodiments, the noise reduction operation S1420 may be the same as the operation of the noise reduction module 320 described above with reference to FIG. 3.

Figure 14:
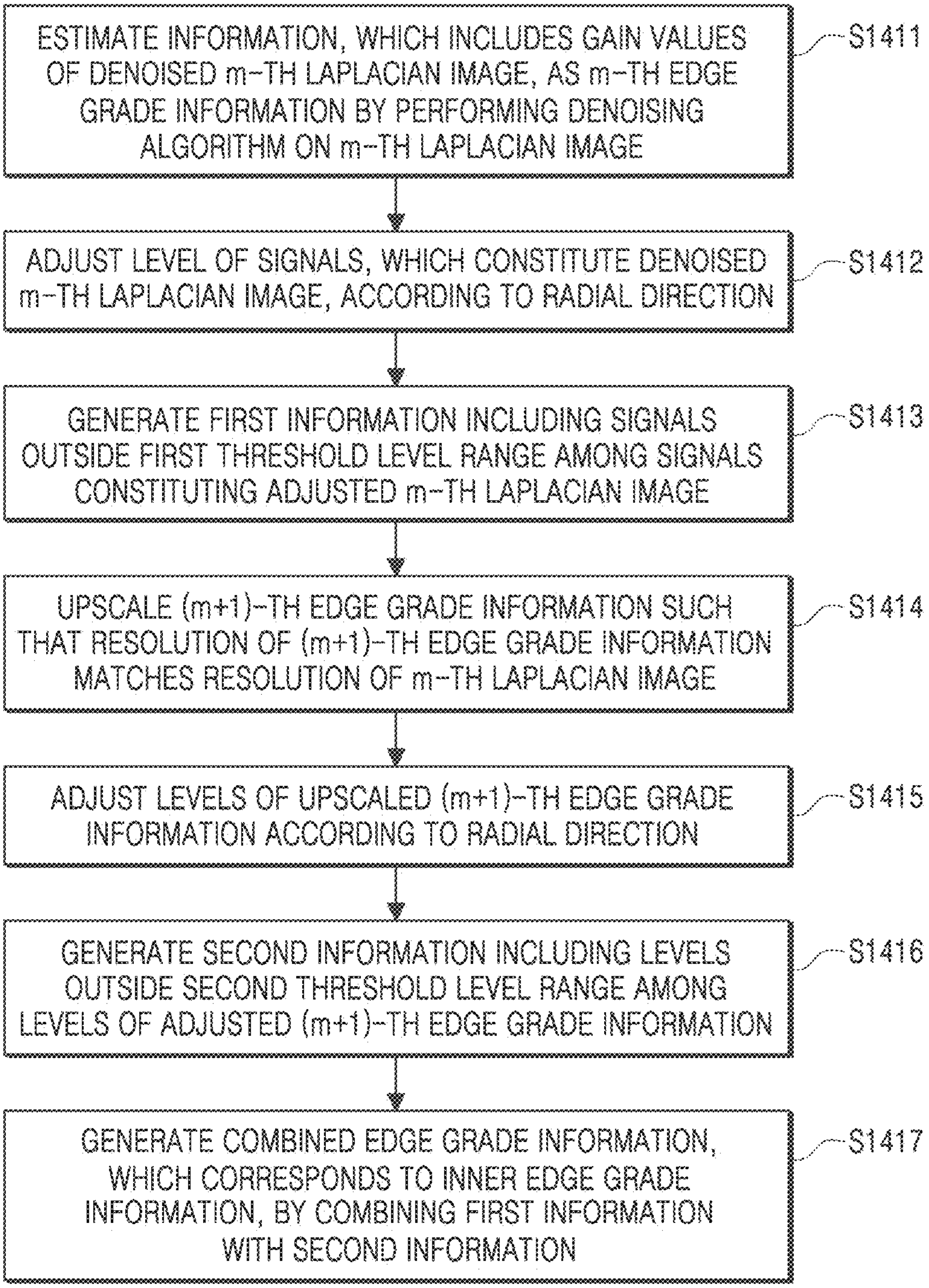
FIG. 14 is a flowchart of an example of operation S1410 in FIG. 13.

FIG. 14 is a flowchart of an example of the edge grade estimation operation S1410 in FIG. 13.

Referring to FIGS. 13 and 14, the processor may estimate information, which includes gain values of a denoised m-th Laplacian image, as the m-th edge grade information by performing a denoising algorithm on the m-th Laplacian image in operation S1411. Operation S1411 may be the same as the operation of the noise suppression module 410 in FIG. 4.

The processor may adjust the level of signals, which constitute the denoised m-th Laplacian image, according to the radial direction in operation S1412. Operation S1412 may be the same as the operation of the first radial correction module 411 in FIG. 4.

The processor may generate first information, which includes signals outside the first threshold level range among the signals constituting the adjusted m-th Laplacian image, in operation S1413. Operation S1413 may be the same as the operation of the first coring module 412 in FIG. 4.

The processor may upscale the (m+1)-th edge grade information such that the resolution of the (m+1)-th edge grade information matches the resolution of the m-th Laplacian image, in operation S1414. Operation S1414 may be the same as the operation of the upscaling module 420 in FIG. 4.

The processor may adjust the levels of the upscaled (m+1)-th edge grade information according to the radial direction in operation S1415. Operation S1415 may be the same as the operation of the second radial correction module 421 in FIG. 4.

The processor may generate second information, which includes levels outside the second threshold level range among the levels of the adjusted (m+1)-th edge grade information, in operation S1416. Operation S1416 may be the same as the operation of the second coring module 422 in FIG. 4.

The processor may generate combined edge grade information, which corresponds to the inner edge grade information, by combining the first information with the second information in operation S1417. Operation S1417 may be the same as the operation of the mixing module 430 in FIG. 4.

Figure 15:
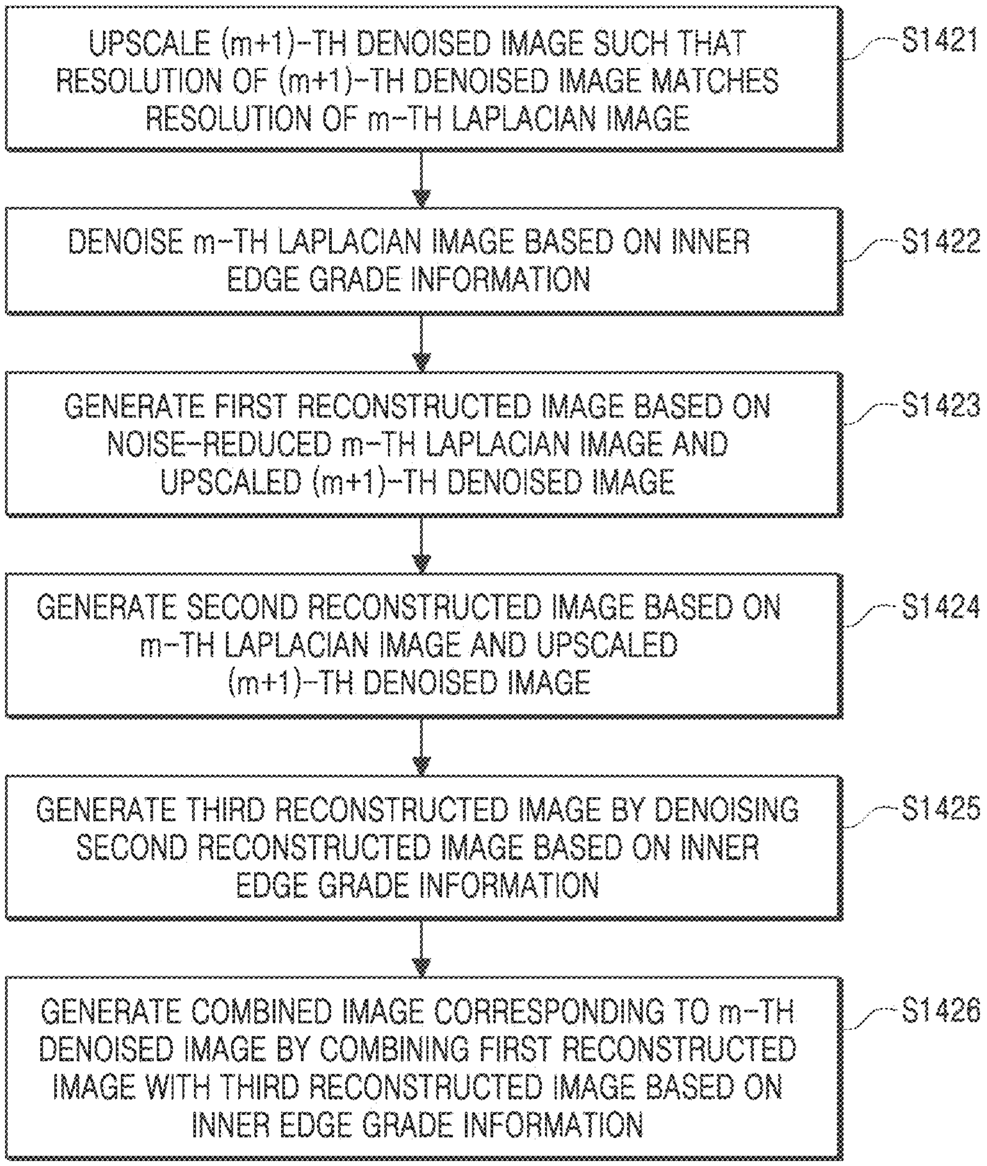
FIG. 15 is a flowchart of an example of operation S1420 in FIG. 13.

FIG. 15 is a flowchart of an example of the noise reduction operation S1420 in FIG. 13.

Referring to FIGS. 13 and 15, the processor may upscale the (m+1)-th denoised image such that the resolution of the (m+1)-th denoised image matches the resolution of the m-th Laplacian image, in operation S1421. Operation S1421 may be the same as the operation of the upscaling module 510 in FIG. 5.

The processor may denoise the m-th Laplacian image based on the inner edge grade information in operation S1422 and may generate a first reconstructed image based on the noise-reduced m-th Laplacian image and the upscaled (m+1)-th denoised image in operation S1423. Operations S1422 and S1423 may be the same as the operations of the Laplacian noise reduction module 520 in FIGS. 5 and 6.

The processor may generate a second reconstructed image based on the m-th Laplacian image and the upscaled (m+1)-th denoised image in operation S1424 and may generate a third reconstructed image by denoising the second reconstructed image based on the inner edge grade information, in operation S1425. Operations S1424 and S1425 may be the same as the operations of the Gaussian noise reduction module 530 in FIGS. 5 and 7.

The processor may generate a combined image corresponding to the m-th denoised image by combining the first reconstructed image with the third reconstructed image based on the inner edge grade information, in operation S1426. Operation S1426 may be the same as the operation of the blending module 540 in FIG. 5.

Figure 16:
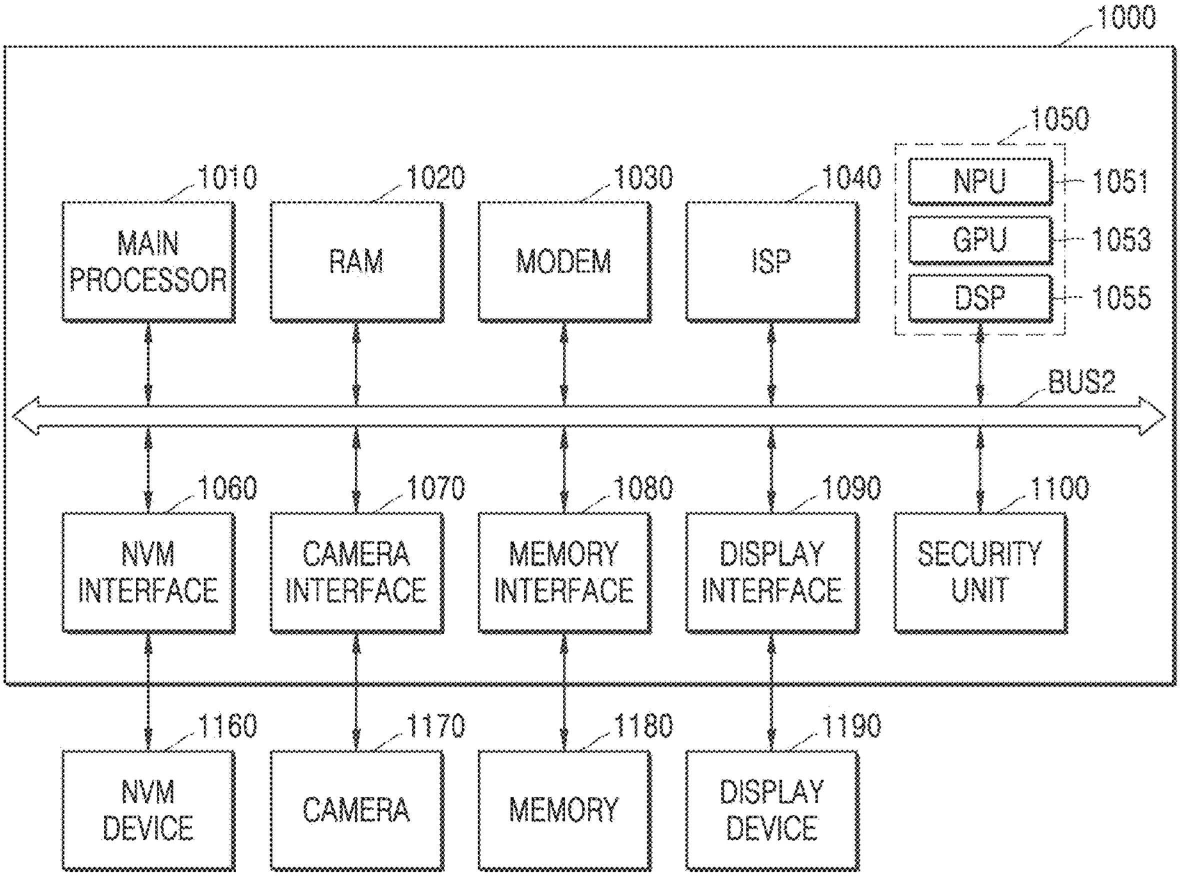
FIG. 16 is a block diagram showing a system-on-chip and peripheral devices, according to some example embodiments.

FIG. 16 is a block diagram showing a system-on-chip (SoC) 1000 and peripheral devices (e.g., 1160, 1170, 1180, and 1190), according to some example embodiments.

Referring to FIG. 16, the SoC 1000 may refer to a computer system or an electronic system, in which various types of semiconductor intellectual property (or functional blocks), such as a central processing unit (CPU), a memory, an interface, a digital signal processing circuit, and an analog signal processing circuit, are integrated into a single semiconductor integrated circuit. In some example embodiments, the SoC 1000 may be referred to as an application processor.

The SoC 1000 may include a main processor 1010, RAM 1020, a modem 1030, an ISP 1040, an accelerator module 1050 including a neural processing unit (NPU) 1051, a graphics processing unit (GPU) 1053, and a digital signal processor (DSP) 1055, a non-volatile memory (NVM) interface 1060, a camera interface 1070, a memory interface 1080, and a display interface 1090. Components, for example, the main processor 1010, the RAM 1020, the modem 1030, the ISP 1040, the NVM interface 1060, the camera interface 1070, the memory interface 1080, and the display interface 1090, of the SoC 1000 may exchange data through a second bus BUS2.

The main processor 1010 may generally control operations of the SoC 1000. The main processor 1010 may include, for example, a CPU, a microprocessor, an ARM processor, an X86 processor, or an MIPS processor. According to some example embodiments, the main processor 1010 may include a single computing component, for example, a multi-core processor, which has at least two independent processors (or cores). The main processor 1010 may process or execute instruction code (e.g., instructions) stored in the RAM 1020.

The RAM 1020 may temporarily store programs, data, and/or instructions. According to some example embodiments, the RAM 1020 may include DRAM or SRAM. The RAM 1020 may temporarily store data input or output through interfaces (e.g., 1060, 1070, 1080, and 1090) or data processed by the ISP 1040.

The NVM interface 1060 may interface data input from an NVM device 1160 or data output to the NVM device 1160. For example, the NVM device 1160 may include a memory card, such as a multimedia card (MMC), an embedded MMC (eMMC), a secure digital (SD) card, or a micro SD card.

The camera interface 1070 may interface image data (e.g., raw image data) input from a camera 1170 outside the SoC 1000. The camera 1170 may generate data about an image captured by using a plurality of photoelectric conversion elements. Image data received through the camera interface 1070 may be provided to the ISP 1040 or may be stored in a memory 1180 through the memory interface 1080.

The memory interface 1080 may interface data input from the memory 1180 or data output to the memory 1180. According to some example embodiments, the memory 1180 may include volatile memory, such as DRAM or SRAM, or non-volatile memory, such as resistive RAM (ReRAM), phase-change RAM (PRAM), or NAND flash memory.

The display interface 1090 may interface data (e.g., image data) output to a display device 1190. The display device 1190 may output image signals through a display, such as a liquid crystal display (LCD) or an active matrix organic light-emitting diode (AMOLED) display, according to image data.

The ISP 1040 may generate converted image data by performing image processing on image data provided from the camera 1170 and store the converted image data in the memory 1180 or may scale the converted image data and provide a scaled image to the display device 1190. The SoC 1000 may further include a security unit 1100, which includes a security method, a protocol, and an encryption and decryption key.

In some example embodiments as described above with reference to FIGS. 1 to 15 may be applied to the ISP 1040 in FIG. 16.

When the terms "about" or "substantially" are used in this specification in connection with a numerical value, it is intended that the associated numerical value includes a manufacturing or operational tolerance (e.g., ±10%) around the stated numerical value. Moreover, when the words "generally" and "substantially" are used in connection with geometric shapes, it is intended that precision of the geometric shape is not required but that latitude for the shape is within the scope of the disclosure. Further, regardless of whether numerical values or shapes are modified as "about" or "substantially," it will be understood that these values and shapes should be construed as including a manufacturing or operational tolerance (e.g., ±10%) around the stated numerical values or shapes.

As described herein, any electronic devices and/or portions thereof according to any of the example embodiments may include, may be included in, and/or may be implemented by one or more instances of processing circuitry such as hardware including logic circuits; a hardware/software combination such as a processor executing software; or any combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device (e.g., a memory), for example a DRAM device, storing a program of instructions, and a processor (e.g., CPU) configured to execute the program of instructions to implement the functionality and/or methods performed by some or all of any devices, systems, modules, units, controllers, circuits, architectures, and/or portions thereof according to any of the example embodiments, and/or any portions thereof.

While the inventive concepts have been particularly shown and described with reference to example embodiments thereof, it will be understood that various changes in form and details may be made therein without departing from the spirit and scope of the following claims.

What is claimed is:

1. A system-on-chip comprising:
- a pyramid generation module configured to
  - receive an input image,
  - generate an image pyramid based on the input image, and
  - output a Gaussian image of a highest layer and a Laplacian pyramid, the image pyramid including the Laplacian pyramid and a Gaussian pyramid;
- a denoising process module configured to
  - receive the Gaussian image of the highest layer,
  - perform a denoising operation on the Gaussian image of the highest layer, and
  - output a denoised image of the highest layer, the denoised image of the highest layer indicating a Gaussian image obtained by removing noise from the Gaussian image of the highest layer; and
- a pyramid reconstruction module configured to
  - receive the Laplacian pyramid and the denoised image of the highest layer,
  - generate a denoised image and edge grade information for each layer based on a Laplacian image of each layer, a denoised image of an upper layer that is one level higher than each layer, and edge grade information of the upper layer, and
  - output an output image based on a Laplacian image of a lowest layer, a denoised image of a first layer, and edge grade information of the first layer, the edge grade information of the upper layer including gain values corresponding to an edge of the Laplacian image of the upper layer, and the first layer being one level higher than the lowest layer.

2. The system-on-chip of claim 1, wherein the pyramid reconstruction module includes:
- a top reconstruction module configured to receive the denoised image of the highest layer and a Laplacian image of an n-th layer that is one level lower than the highest layer and output a denoised image of the n-th layer and edge grade information of the n-th layer, "n" being a natural number;
- at least one middle reconstruction module configured to receive a Laplacian image of an m-th layer that is lower than the n-th layer, a denoised image of an (m+1)-th layer that is one level higher than the m-th layer, and edge grade information of the (m+1)-th layer and output a denoised image of the m-th layer and edge grade information of the m-th layer, "m" being a natural number that is less than "n"; and
- a bottom reconstruction module configured to receive the Laplacian image of the lowest layer, the denoised image of the first layer, and the edge grade information of the first layer and output the output image.

3. The system-on-chip of claim 2, wherein the at least one middle reconstruction module includes:
- an edge grade estimation module configured to output the edge grade information of the m-th layer based on the Laplacian image of the m-th layer and estimate inner edge grade information of the m-th layer, based on the Laplacian image of the m-th layer and the edge grade information of the (m+1)-th layer; and a noise reduction module configured to perform the denoising operation on each of the Laplacian image of the m-th layer and the denoised image of the (m+1)-th layer, based on the inner edge grade information of the m-th layer, and output the denoised image of the m-th layer, based on results of the denoising operation and the inner edge grade information of the m-th layer.

4. The system-on-chip of claim 3, wherein the edge grade estimation module includes:

a noise suppression module configured to remove noise from the Laplacian image of the m-th layer and output, as the edge grade information of the m-th layer, information including gain values of a noise-removed Laplacian image;

a first radial correction module configured to adjust a level of signals constituting the noise-removed Laplacian image according to a radial direction and output an adjusted Laplacian image;

a first coring module configured to remove a signal within a first threshold level range from among signals constituting the adjusted Laplacian image, detect a signal outside the first threshold level range, and output first information including signals outside the first threshold level range;

an upscaling module configured to upscale the edge grade information of the (m+1)-th layer and output upscaled edge grade information;

a second radial correction module configured to adjust levels of the upscaled edge grade information according to the radial direction and output adjusted edge grade information;

a second coring module configured to remove a level within a second threshold level range from among levels of the adjusted edge grade information, detect a level outside the second threshold level range, and output second information including levels outside the second threshold level range; and a mixing module configured to combine the first information with the second information and output combined edge grade information as the inner edge grade information of the m-th layer.

5. The system-on-chip of claim 3, wherein the noise reduction module includes:

an upscaling module configured to upscale the denoised image of the (m+1)-th layer and output an upscaled denoised image;

a Laplacian noise reduction module configured to remove noise from the Laplacian image of the m-th layer based on the inner edge grade information of the m-th layer and generate a first reconstructed image, based on a noise-reduced Laplacian image and the upscaled denoised image;

a Gaussian noise reduction module configured to generate a second reconstructed image, based on the Laplacian image of the m-th layer and the upscaled denoised image, remove noise from the second reconstructed image based on the inner edge grade information of the m-th layer, and output a third reconstructed image resulting from removing noise from the second reconstructed image; and a blending module configured to combine the first reconstructed image with the third reconstructed image, based on the inner edge grade information of the m-th layer, and output a combined image as the denoised image of the m-th layer.

6. The system-on-chip of claim 2, wherein the top reconstruction module includes:

an edge grade estimation module configured to estimate the edge grade information of the n-th layer and inner edge grade information of the n-th layer, based on the Laplacian image of the n-th layer; and a noise reduction module configured to perform the denoising operation on each of the Laplacian image of the n-th layer and the denoised image of the highest layer, based on the inner edge grade information of the n-th layer, and output the denoised image of the n-th layer, based on results of the denoising operation and the inner edge grade information of the n-th layer.

7. The system-on-chip of claim 2, wherein the bottom reconstruction module includes:

an edge grade estimation module configured to estimate inner edge grade information of the lowest layer, based on the Laplacian image of the lowest layer and the edge grade information of the first layer; and a noise reduction module configured to perform the denoising operation on each of the Laplacian image of the lowest layer and the denoised image of the first layer, based on the inner edge grade information of the lowest layer, and output the output image, based on results of the denoising operation and the inner edge grade information of the lowest layer.

8. An electronic device comprising:

an image sensor configured to convert an optical signal of an object into an electrical signal and output an input image corresponding to the electrical signal; and an image signal processor configured to receive the input image, perform an image processing operation on the input image, and output an output image, the image signal processor including a pyramid generation module configured to generate an image pyramid based on the input image and output a Gaussian image of a highest layer and a Laplacian pyramid, the image pyramid including the Laplacian pyramid and a Gaussian pyramid;

a denoising process module configured to receive the Gaussian image of the highest layer, perform a denoising operation on the Gaussian image of the highest layer, and output a denoised image of the highest layer, the denoised image of the highest layer indicating a Gaussian image obtained by removing noise from the Gaussian image of the highest layer; and a pyramid reconstruction module configured to receive the Laplacian pyramid and the denoised image of the highest layer, generate a denoised image and edge grade information for each layer based on a Laplacian image of each layer, a denoised image of an upper layer that is one level higher than each layer, and edge grade information of the upper layer, and output the output image based on a Laplacian image of a lowest layer, a denoised image of a first layer, and edge grade information of the first layer, the edge grade information of the upper layer including gain values corresponding to an edge of the Laplacian image of the upper layer, and the first layer being one level higher than the lowest layer.

9. The electronic device of claim 8, wherein the pyramid reconstruction module includes:

a top reconstruction module configured to receive the denoised image of the highest layer and a Laplacian image of an n-th layer that is one level lower than the highest layer and output a denoised image of the n-th layer and edge grade information of the n-th layer, "n" being a natural number;

at least one middle reconstruction module configured to receive a Laplacian image of an m-th layer that is lower than the n-th layer, a denoised image of an (m+1)-th layer that is one level higher than the m-th layer, and edge grade information of the (m+1)-th layer and output a denoised image of the m-th layer and edge grade information of the m-th layer, "m" being a natural number that is less than "n"; and a bottom reconstruction module configured to receive the Laplacian image of the lowest layer, the denoised image of the first layer, and the edge grade information of the first layer and output the output image.

10. The electronic device of claim 9, wherein the at least one middle reconstruction module includes:

an edge grade estimation module configured to output the edge grade information of the m-th layer based on the Laplacian image of the m-th layer and estimate inner edge grade information of the m-th layer, based on the Laplacian image of the m-th layer and the edge grade information of the (m+1)-th layer; and a noise reduction module configured to perform the denoising operation on each of the Laplacian image of the m-th layer and the denoised image of the (m+1)-th layer, based on the inner edge grade information of the m-th layer, and output the denoised image of the m-th layer, based on results of the denoising operation and the inner edge grade information of the m-th layer.

11. The electronic device of claim 10, wherein the edge grade estimation module includes:

a noise suppression module configured to remove noise from the Laplacian image of the m-th layer and output, as the edge grade information of the m-th layer, information including gain values of a noise-removed Laplacian image;

a first radial correction module configured to adjust a level of signals constituting the noise-removed Laplacian image according to a radial direction and output an adjusted Laplacian image;

a first coring module configured to remove a signal within a first threshold level range from among signals constituting the adjusted Laplacian image, detect a signal outside the first threshold level range, and output first information including signals outside the first threshold level range;

an upscaling module configured to upscale the edge grade information of the (m+1)-th layer and output upscaled edge grade information;

a second radial correction module configured to adjust levels of the upscaled edge grade information according to the radial direction and output adjusted edge grade information;

a second coring module configured to remove a level within a second threshold level range from among levels of the adjusted edge grade information, detect a level outside the second threshold level range, and output second information including levels outside the second threshold level range; and a mixing module configured to combine the first information with the second information and output combined edge grade information as the inner edge grade information of the m-th layer.

12. The electronic device of claim 10, wherein the noise reduction module includes:

an upscaling module configured to upscale the denoised image of the (m+1)-th layer and output an upscaled denoised image;

a Laplacian noise reduction module configured to remove noise from the Laplacian image of the m-th layer based on the inner edge grade information of the m-th layer and generate a first reconstructed image, based on a noise-reduced Laplacian image and the upscaled denoised image;

a Gaussian noise reduction module configured to generate a second reconstructed image, based on the Laplacian image of the m-th layer and the upscaled denoised image, remove noise from the second reconstructed image based on the inner edge grade information of the m-th layer, and output a third reconstructed image resulting from removing noise from the second reconstructed image; and a blending module configured to combine the first reconstructed image with the third reconstructed image, based on the inner edge grade information of the m-th layer, and output a combined image as the denoised image of the m-th layer.

13. The electronic device of claim 9, wherein the top reconstruction module includes:

an edge grade estimation module configured to estimate the edge grade information of the n-th layer and inner edge grade information of the n-th layer, based on the Laplacian image of the n-th layer; and a noise reduction module configured to perform the denoising operation on each of the Laplacian image of the n-th layer and the denoised image of the highest layer, based on the inner edge grade information of the n-th layer, and output the denoised image of the n-th layer, based on results of the denoising operation and the inner edge grade information of the n-th layer.

14. The electronic device of claim 9, wherein the bottom reconstruction module includes:

an edge grade estimation module configured to estimate inner edge grade information of the lowest layer, based on the Laplacian image of the lowest layer and the edge grade information of the first layer; and a noise reduction module configured to perform the denoising operation on each of the Laplacian image of the lowest layer and the denoised image of the first layer, based on the inner edge grade information of the lowest layer, and output the output image, based on results of the denoising operation and the inner edge grade information of the lowest layer.

15. An operating method of a processor, the operating method comprising:

an image receiving operation including receiving an input image;

a pyramid decomposition operation including generating an image pyramid and a highest Gaussian image of a highest layer, based on the input image;

a denoising operation including generating a highest denoised image by removing noise from the highest Gaussian image, the highest denoised image indicating a Gaussian image resulting from removing noise from the highest Gaussian image;

a pyramid reconstruction operation including generating a denoised image and edge grade information for each of the layers sequentially from the highest layer to a first layer, based on a Laplacian image of each layer in a Laplacian pyramid of the image pyramid, a denoised image of an upper layer that is one level higher than each layer, and edge grade information of the upper layer, the edge grade information of the upper layer including gain values corresponding to an edge of a Laplacian image of the upper layer; and an image output operation including outputting an output image, based on a Laplacian image of a lowest layer that is lower than the first layer, a first denoised image of the first layer, and first edge grade information.

16. The operating method of claim 15, wherein the pyramid reconstruction operation further includes:

a first reconstruction operation including generating an n-th denoised image of an n-th layer and n-th edge grade information of the n-th layer, based on an n-th Laplacian image of the n-th layer and the highest denoised image, "n" being an integer of at least 2; and a second reconstruction operation including generating an m-th denoised image of an m-th layer and m-th edge grade information of the m-th layer, based on an m-th Laplacian image of the m-th layer, an (m+1)-th denoised image of an (m+1)-th layer, and (m+1)-th edge grade information of the (m+1)-th layer, "m" being a natural number that is less than "n".

17. The operating method of claim 16, wherein the second reconstruction operation further includes:

an edge grade estimation operation including estimating the m-th edge grade information and inner edge grade information of the m-th layer, based on the m-th Laplacian image and the (m+1)-th edge grade information; and a noise reduction operation including generating the m-th denoised image, based on the m-th Laplacian image, the (m+1)-th denoised image, and the inner edge grade information.

18. The operating method of claim 17, wherein the edge grade estimation operation further includes:

estimating, as the m-th edge grade information, information including gain values of a noise-removed m-th Laplacian image by performing a denoising algorithm on the m-th Laplacian image;

adjusting, according to a radial direction, a level of signals constituting the noise-removed m-th Laplacian image;

generating first information including signals outside a first threshold level range among signals constituting an adjusted m-th Laplacian image;

upscaling the (m+1)-th edge grade information, wherein a resolution of the (m+1)-th edge grade information matches a resolution of the m-th Laplacian image;

adjusting levels of upscaled (m+1)-th edge grade information according to the radial direction;

generating second information including levels outside a second threshold level range among levels of adjusted (m+1)-th edge grade information; and generating combined edge grade information corresponding to the inner edge grade information by combining the first information with the second information.

19. The operating method of claim 17, wherein the noise reduction operation further includes:

upscaling the (m+1)-th denoised image, wherein a resolution of the (m+1)-th denoised image matches a resolution of the m-th Laplacian image;

removing noise from the m-th Laplacian image based on the inner edge grade information;

generating a first reconstructed image, based on a noise-reduced m-th Laplacian image and an upscaled (m+1)-th denoised image;

generating a second reconstructed image, based on the m-th Laplacian image and the upscaled (m+1)-th denoised image;

generating a third reconstructed image, by removing noise from the second reconstructed image based on the inner edge grade information; and generating a combined image corresponding to the m-th denoised image by combining the first reconstructed image with the third reconstructed image based on the inner edge grade information.

20. The operating method of claim 15, further comprising:

a data write operation including controlling a main memory to store the Laplacian pyramid and the highest Gaussian image in the main memory; and a data read operation including controlling the main memory to read the Laplacian pyramid and the highest Gaussian image from the main memory.

* * * * *